United States Patent
Balazich et al.

(10) Patent No.: US 7,111,196 B2
(45) Date of Patent: Sep. 19, 2006

(54) SYSTEM AND METHOD FOR PROVIDING PROCESSOR RECOVERY IN A MULTI-CORE SYSTEM

(75) Inventors: Douglas G. Balazich, Poughkeepsie, NY (US); Michael Billeci, Poughkeepsie, NY (US); Anthony Saporito, Wappingers Falls, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 10/435,563

(22) Filed: May 12, 2003

(65) Prior Publication Data

US 2004/0230865 A1 Nov. 18, 2004

(51) Int. Cl.
*G06F 11/00* (2006.01)

(52) U.S. Cl. .................. 714/13; 714/10; 714/11; 714/12

(58) Field of Classification Search ............. 714/10–13
See application file for complete search history.

(56) References Cited

U.S. PATENT DOCUMENTS

| | | | |
|---|---|---|---|
| 5,504,859 A | 4/1996 | Gustafson et al. | |
| 5,692,121 A | 11/1997 | Bozso et al. | |
| 6,115,829 A | 9/2000 | Slegel et al. | |
| 6,189,112 B1 | 2/2001 | Slegel et al. | |
| 6,625,749 B1 * | 9/2003 | Quach ...................... | 714/10 |

\* cited by examiner

*Primary Examiner*—Robert Beausoliel
*Assistant Examiner*—Charles Ehne
(74) *Attorney, Agent, or Firm*—Lynn Augspurger; Cantor Colburn LLP

(57) ABSTRACT

An embodiment of the invention is a multiprocessor system for detecting and recovering from errors. The multiprocessor system includes a first processor and a second processor. The first processor detects an error and initiates a recovery process. The first processor and said second processor synchronize at least one recovery action during the recovery process.

13 Claims, 3 Drawing Sheets

SYSTEM AND METHOD FOR PROVIDING PROCESSOR RECOVERY IN A MULTI-CORE SYSTEM

FIELD OF THE INVENTION

This invention relates to fault recovery in multiprocessor systems. The invention is particularly directed to fault recovery in systems having multiple processor cores on a single die utilizing shared on-chip resources.

BACKGROUND

Existing single core processor chips use a variety of techniques and algorithms to implement fault recovery. Exemplary techniques are disclosed in U.S. Pat. No. 5,504,859 and U.S. Pat. No. 5,692,121. In such systems, a master copy of all the processor's architected facilities is maintained in a recovery unit. The contents of these facilities is referred to as the processor's "checkpointed state". The modifications which result from the execution of an instruction are allowed to trickle down and update the checkpointed state only after that instruction completes without error. On detection of a recoverable error, the processor executes the following steps:

1) Preserve the checkpointed state by immediately blocking all updates to it.
2) Release all stores, and perform all writes, which have been queued up by previously checkpointed instructions.
3) Re-initialize the protected arrays back to their starting state (using the array built in self test, or ABIST, engines).
4) Refresh all copies of the architected facilities with the contents of the checkpointed state.
5) Begin execution at the point before the failure was encountered.
6) Make sure the processor achieves forward progress in the execution of the instruction stream (i.e. make sure it does not keep encountering the same, or some other, error before any progress is made).

There are some errors which a given core cannot recover from. When such an error is encountered the processor must stop running. The checkpointed state of the stopped processor is often loaded into a spare processor, when available, where execution may be able to continue uninterrupted (from an end user's perspective). This action is referred to as a processor checkstop followed by dynamic central processor (CP) sparing which is disclosed in U.S. Pat. No. 6,189,112 and U.S. Pat. No. 6,115,829. Upon detection of a non-recoverable, or checkstop, error the processor will:

1) Try and preserve the checkpointed state by immediately blocking all updates.
2) Notify the system that the chip must stop running by driving the any_check line high to the clock chip.
3) The clock chip will eventually stop the clocks to the checkstopped processor.

The problem with this design is that any core going through recovery or checkstop takes on a certain amount of risk. For the recovery case, a core has the risk of causing Instruction Processing Damage (IPD). An IPD error indicates that previously queued operations by this processor may be suspect. The processor is reset in order to perform IPD recovery. This involves notifying the operating system that the task at hand must be aborted and retired. For the checkstop case, a core has the risk of stopping in a state in which CP sparing is not possible. Thus, techniques are needed to handle processor recovery in multi-core environments.

SUMMARY OF THE INVENTION

An embodiment of the invention is a multiprocessor system for detecting and recovering from errors. The multiprocessor system includes a first processor and a second processor. The first processor detects an error and initiates a recovery process. The first processor and said second processor synchronize at least one recovery action during the recovery process.

These and other improvements are set forth in the following detailed description. For a better understanding of the invention with advantages and features, refer to the description and to the drawings.

The detailed description explains the preferred embodiments of our invention, together with advantages and features, by way of example with reference to the drawings.

DETAILED DESCRIPTION

Embodiments of the invention pertain to recovering from an error experienced by one core in a multi-core system. An internal error is a fault detected locally on a given core. An external error is a fault indicated by another core. The core which detects an internal error may be referred to as the bad core. A core which must initiate a recovery or checkstop sequence due to an external error may be referred to as the good core.

In the exemplary dual core design, the cores share a common asynchronous interface to the storage subsystem. The cores also share a single scan chain. Given the design, when a single core is required to go through recovery or is required to checkstop, then both cores go through recovery or checkstop together.

Embodiments of the invention involve error detection and handling logic which is replicated on both cores of a multi-core processor. Both instances of this multi-dropped logic interface with each other in order to keep track of internal and external errors. The common interface between the error logic is also used to synchronize both cores throughout recovery and checkstop sequences. These mechanisms are used to allow both cores to go through recovery and checkstop together.

Embodiments of the invention also relate to steps taken to improve the chance that the good core will either go through recovery successfully or checkstop with stability. These steps involve the good core allowing all issued instructions to complete and checkpoint before either core moves past the initial phase of the recovery sequence. This pipe drain also takes place on the good core during an external checkstop sequence, but with the addition of a feature which allows continued execution until Licensed Internal Code (commonly referred to as microcode) indicates the chip is in a good state for sparing.

Figure 1:
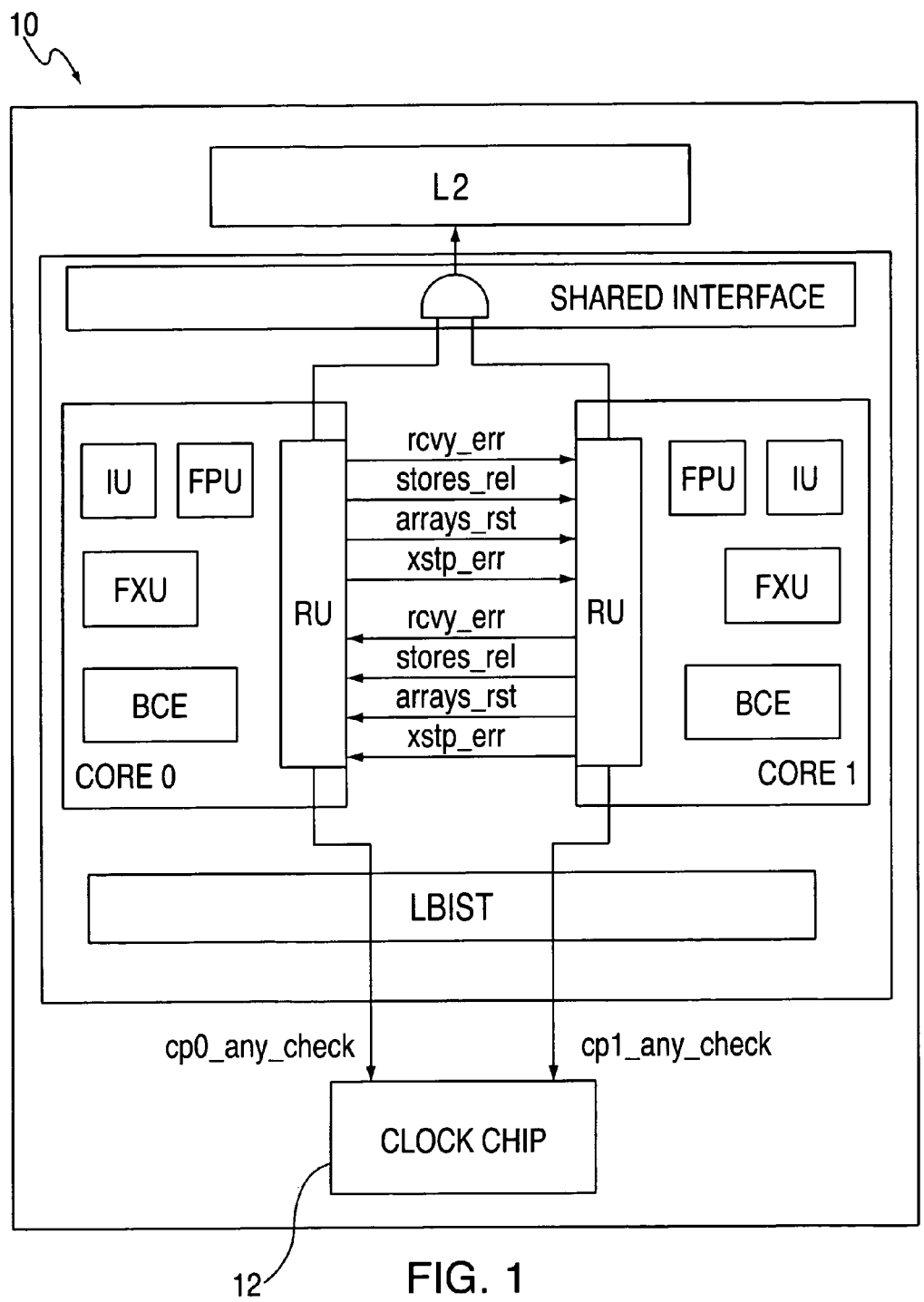
FIG. 1 is a block diagram of a multi-core system.

FIG. 1 is a block diagram of a multi-processor system 10 including two cores core0 and core1 each of which includes one or more processors. One or more processors in each core perform the processing described herein. Each core includes a processor-implemented recovery unit (RU). The recovery units RU on each core send each other multiple signals as shown in FIG. 1. A recovery error signal (depicted as rcvy_err) instructs the receiving core that the sending core has detected an internal recoverable error.

A checkstop error signal (depicted as xstp_err) instructs the receiving core that the sending core has detected an internal non-recoverable, or checkstop, error. This checkstop error signal is also used to indicate that the sending core has escalated a recoverable error to a non-recoverable error. The good core will also use this signal to indicate to the bad core that it has completed its delayed checkstop sequence.

A stores released signal (depicted as stores_rel) instructs the receiving core that the sending core has released all checkpointed stores. An array reset signal (arrays_rst) instructs the receiving core that the arrays on the sending core have finished array built in self test (ABSIT) and are reset. The exchange of these signals during the recovery process is discussed in detail herein.

Figure 2:
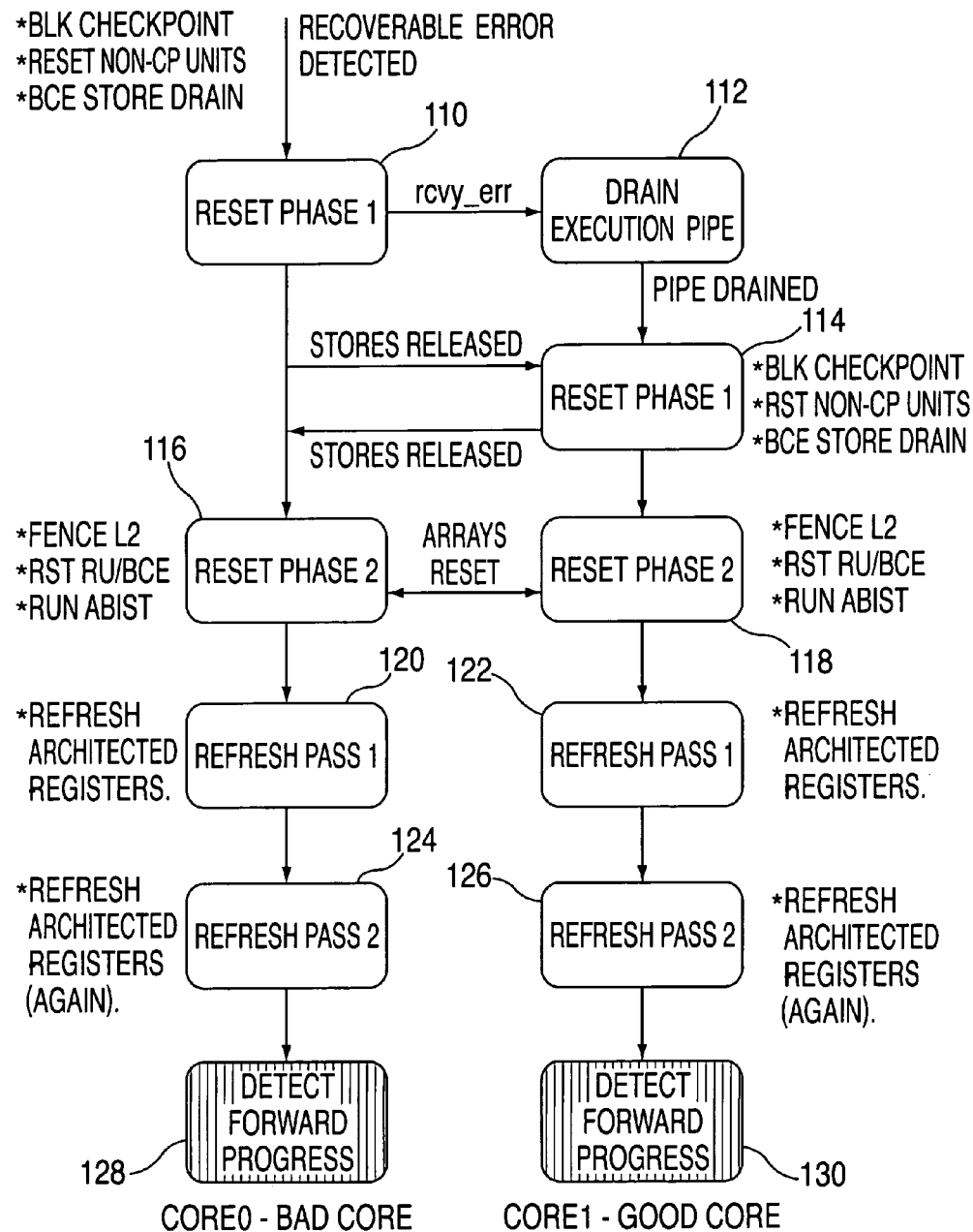
FIG. 2 is a flowchart of processing performed by each core when a recoverable error is detected.

FIG. 2 is a flowchart of processing performed by each core when a recoverable error is detected. FIG. 2 shows recovery unit RU of core0, the bad core, detecting an internal recoverable error, and notifying the good core, core1. At step 110, the bad core enters a first reset phase and recovery unit RU of core0 sends the recovery error signal, rcvy_err, to the recovery unit RU of core1. At this point, the buffer control element (BCE) and the recovery unit RU of core0 immediately blocks updates to its checkpointed state. Core0 resets all the units on the core which do not contain a master copy of a checkpointed facility such as the instruction unit (IU), floating-point unit (FPU) and the fixed-point unit (FXU). The BCE of core0 will then move on and allow the data cache to release all stores which have been queued up by previously checkpointed instructions.

While core0 is performing these actions in the reset phase1, core1 has initiated a pipe drain as shown at step 112. To drain its pipeline, core1 halts further instruction decode/ issue and allows any in-flight instructions to complete and checkpoint. This step avoids instruction processing damage in the situation where the data cache has pre-released stores for non-checkpointed instructions which may be done to improve performance.

When core0 has completed the first reset phase by releasing its stores at step 110, the stores released signal, stores_rel, is sent from recovery unit RU of core0 to recovery unit RU of core1. This is the first synchronization point in the recovery sequence. Core0 waits at this point until core1 performs the first reset phase as shown at sep 114. Core1, once finished with its pipe drain at step 112, blocks updates to its checkpoint state, resets the non-checkpoint units, and allows all stores for checkpointed instructions to be released to L2 cache at step 114. Once core1 completes these steps during the first reset phase at step 114, core1 sends a stores released signal, stores_rel, back to core0 in order to synchronize the two state machines. Note that neither core will move on until core0 completes step 110 and core1 completes step 114.

Once step 114 is completed by core 1, core0 enters the second reset phase at step 116 and core 1 enters the second reset phase at step 118. During steps 116 and 118, both core0 and core1 temporarily fence off their interface to the L2 cache. This is done to keep a core, which may enter an unpredictable state after this point, from sending corrupt data over the interface and corrupting cache storage. This is followed by both core0 and core1 resetting their BCE and recovery units, and then initiating the start of ABIST. The ABIST engines are used to reset the arrays to their initial state. Once ABIST completes, both cores will signal completion of the ABIST by sending the array reset signal, arrays_rst, to the recovery unit 12 of the other core. This is the second synchronization step between the two cores. The two cores will advance through the remaining recovery sequence in synchronization after this point.

When core0 completes step 116 and core1 completes step 118, both core0 and core1 execute a first pass of register refresh as indicated at steps 120 and 122. The first pass of register refresh involves the checkpointed state being written back into all processor facilities which shadow architected registers.

When core0 completes step 120 and core1 completes step 122, both core0 and core1 execute a second pass of register refresh as indicated at steps 124 and 126. Every checkpointed register is protected by ECC. During the first pass through refresh at steps 120 and 122, any single bit error detected on the checkpointed data will be corrected and written back into the checkpoint. During the second pass through refresh at steps 124 and 126, no correctable errors should be detected. If a correctable error is detected at this point by either core0 or core1, then both cores will immediately escalate to a checkstop.

Once steps 124 and 126 are completed and both passes through refresh have been performed, both core0 and core1 will start executing instructions again at steps 128 and 130. As a result of the register refresh, execution of instructions will begin at a point before the initial error was detected. This is referenced in steps 128 and 130 as a forward progress state. Once an instruction checkpoints, recovery is considered finished. Both cores will be brought back into recovery if another error is detected before this point.

Each recovery unit RU includes a programmable threshold value and a recovery counter. The threshold limits the number of times a core can reenter recovery without reaching forward progress at step 128 or 130. If the value of this threshold is exceeded, both cores will checkstop.

Figure 3:
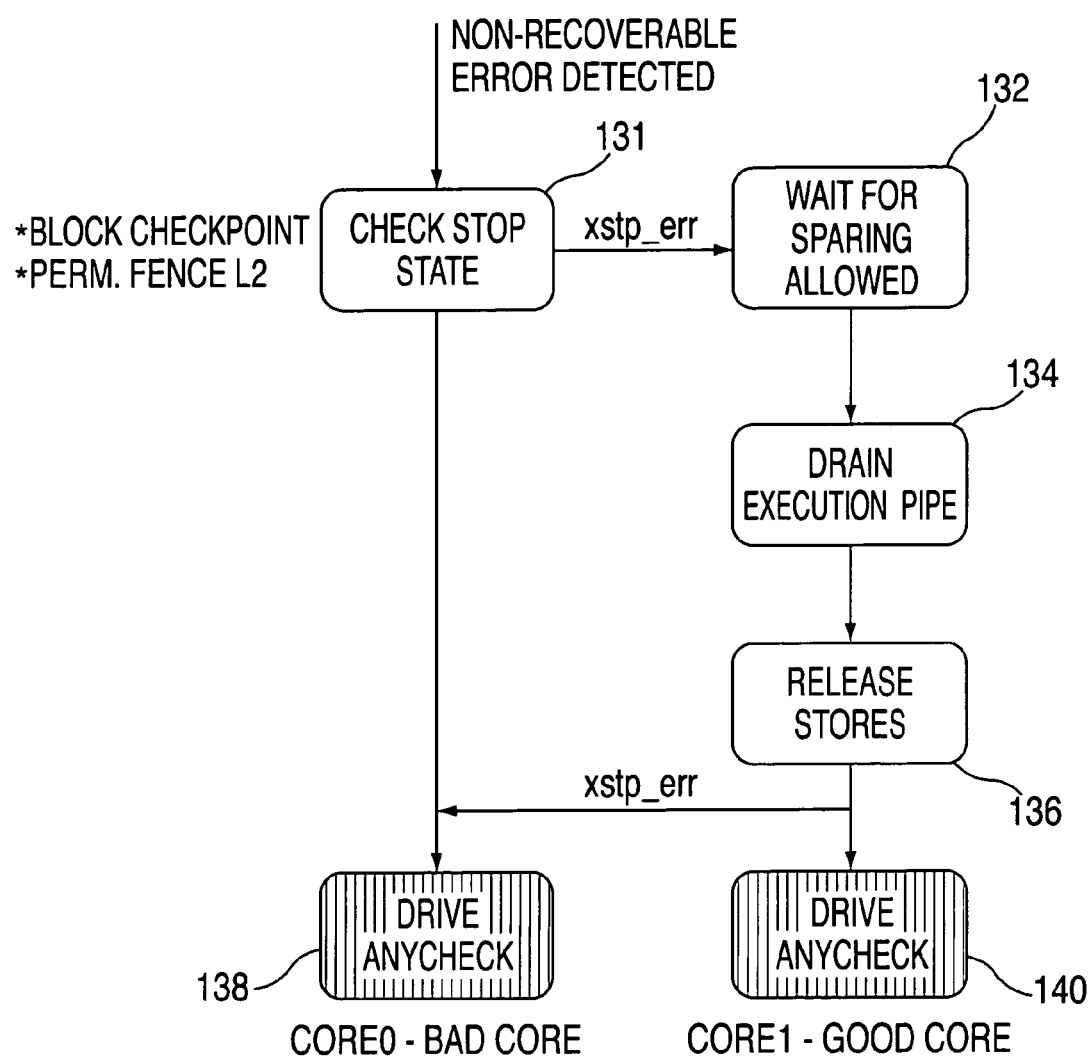
FIG. 3 is a flowchart of processing performed by each core when a non-recoverable error is detected.

FIG. 3 is a flowchart of processing performed by each core when a recoverable error is detected. In the example shown in FIG. 3, core0 detects the non-recoverable error. A non-recoverable error is detected by the recovery unit RU on core0 which notifies core1 by sending a checkstop error signal, xstop_err, to the recovery unit RU of core1 at step 131. At step 131, core0 also blocks all updates to its checkpointed state and attempts to permanently fence its interface to L2 cache storage.

At step 132, core1 receives the checkstop error signal from core0. The goal is to have both cores checkstop so that CP sparing can be implemented. There are situations, however, where CP sparing is not allowed that are invisible to the processor hardware. Microcode running on the processor on core1 will notify the hardware of these situations by setting a bit in a particular register. If this bit is set, core1 will continue to execute instructions until the bit returns to zero. This is shown in step 132 as core1 waiting for CP sparing to be allowed. This allows the system to avoid a failed sparing attempt by keeping core1 from checkstopping until it executes beyond this window.

Once this bit returns to zero, or if it was zero to start with, core1 initiates a pipe drain as shown at step 134. After all in-flight instructions have checkpointed at step 134, core1 will release all stores queued up by previously checkpointed instructions at step 136. Core1 then sends a checkstop error signal, xstp_err, back to core0. This checkstop error signal is used to synchronize processing of the two cores such that core0 does not initiate step 138 until step 136 is complete.

After step 136, both cores will permanently fence the interface to L2 cache, and send respective checkstop signals (referenced as cp0_any_check and cp1_any_check in FIG. 1) to the clock chip 12 at steps 138 and 140, respectively. When these signals are sent to the clock chip 12, it signals that a core has checkstopped and is in a state where its clocks can be turned off. The transmission of a checkstop signal from either core0 or core1 will cause the clocks to the entire chip 10 to stop.

The core synchronization point after step 136 is used to allow the clocks to run until core1 gets to a stable, CP sparing friendly state. Core1 postpones entering the checkstop state while instructions are executed, the execution pipe is drained and stores released. This reduces the chance that core1 will detect IPD in recovery cases while increasing the opportunity that core1 will spare successfully in checkstop cases. This process is referred to as a delayed checkstop sequence.

If core1 detects an error while in the delayed checkstop sequence, both cores will switch to an immediate checkstop sequence. This immediate checkstop sequence includes fencing the L2 cache interface and sending the checkstop signal, any_check, to the clock chip.

It is possible that a given chip will have only one functional core on it. This is referred to as a partial good chip. On a partial good chip, the functional core will know that the other core is dead. As a result, the good core will not pause at any of the synchronization points mentioned above. This in effect reverts the checkstop and recovery sequences back to that of existing single core designs.

Even though examples in this description refer to two cores on a single chip, this invention can scale to support a larger numbers of processors on the same, or different, chips.

Embodiments of the invention allow fault recovery on chips containing multiple replicated processor cores which share resources. Embodiments of the invention also improve the chances of successful recovery, along with checkstopping in a CP sparing state. The combination of these enhancements allow more than a single processor on a chip, through the use of shared resources, without compromising reliability, availability and serviceability.

Embodiments of the invention allow the bad core to delay a recovery or checkstop sequence while the good core continues execution up to the point where it reaches a stable stopping point. This minimizes the chance that the good core will detect IPD in recovery cases while maximizing the opportunity that the good core will spare successfully in checkstop cases.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A multiprocessor system for detecting and recovering from errors, the multiprocessor system comprising:
   a first processor;
   a second processor;
   said first processor detecting a local error internal to the first processor and initiating a recovery process, said first processor and said second processor synchronizing at least one recovery action during said recovery process;
   said error is a recoverable error;
   said first processor executing a first reset phase;
   said second processor executing said first reset phase;
   said first processor and second processor executing a second reset phase synchronization;
   said second processor halting further instruction decoding and allowing in-flight instructions to complete and checkpoint;
   said second processor sends a stores released signal to said first processor to indicate completion of allowing in-flight instructions to complete and checkpoint;
   said first processor delaying executing said second reset phase until receiving said stores released signal.

2. The multiprocessor system of claim 1 wherein:
   said first processor sends said second processor an array reset signal upon completing said second reset phase;
   said second processor sends said first processor said array reset signal upon completing said second reset phase;
   said first processor and said second processor performing a first pass of register refresh in synchronization in response to said array reset signals.

3. The multiprocessor system of claim 1 wherein:
   said error is a non-recoverable error;
   said first processor executing a checkstop routine upon detection of said non-recoverable error, said first processor sending a checkstop error signal to aid second processor;
   said second processor executing a delayed checkstop sequence to enter a stable sparing state.

4. The multiprocessor system of claim 3 wherein:
   said delayed checkstop sequence includes said second processor executing instructions until a sparing bit indicates that sparing is allowed.

5. The multiprocessor system of claim 4 wherein:
   said delayed checkstop sequence includes initiating a pipe drain by allowing in-process instructions to checkpoint.

6. The multiprocessor system of claim 5 wherein:
   said delayed checkstop sequence includes releasing stores queued up by previously checkpointed instructions.

7. The multiprocessor system of claim 6 wherein:
   said second processor sends a checkstop error signal to said first processor upon completing said delayed checkstop sequence;
   said first processor and said second processor entering a checkstop mode in synchronization.

8. The multiprocessor system of claim 1 wherein:
   said first processor and said second processor arc located on one physical chip.

9. The multiprocessor system of claim 1 wherein:
   said first processor and maid second processor sham common resources, including cache storage.

10. A processor for detecting and recovering from errors in a multiprocessor system, the processor implementing a recovery process comprising:
   detecting local error internal to a first processor and initiating a recovery process, notifying a second processor of said error;
   postponing recovery processing until receiving a synchronization signal from said second processor;
   said error is a recoverable error;
   said processor executing a first reset phase;
   said first processor delaying executing of a second reset phase until receiving a stores released signal from said second processor, the stores releases signal indicating that the second processor has halted further instruction decoding and allowed in-flight instructions to complete and checkpoint.

11. The processor of claim 10 wherein:
said processor performs a first pass of register refresh in response to receiving an array reset signal from said second processor.

12. The processor of claim 10 wherein:
said error Is a non-recoverable error;
said processor executing a check stop routine upon detection of said non-recoverable error,
said processor sending a checkstop error signal to said second processor.

13. The processor of claim 12 wherein:
said first processor receives a checkstop error signal from said second processor enters a checkstop mode.

* * * * *